United States Patent
Popp et al.

Patent Number: 6,148,682
Date of Patent: Nov. 21, 2000

[54] INCREASED-SPONTANEITY AUTOMATIC GEAR BOX

[75] Inventors: Christian Popp, Kressbronn; Friedrich Tenbrock, Langenargen; Hansjörg Rosi, Meckenbeuren, all of Germany

[73] Assignee: ZF Friedrichshafen AG, Friedrichshafen, Germany

[21] Appl. No.: 09/381,109

[22] PCT Filed: Nov. 4, 1999

[86] PCT No.: PCT/EP98/01979

§ 371 Date: Sep. 15, 1999

§ 102(e) Date: Sep. 15, 1999

[87] PCT Pub. No.: WO98/45626

PCT Pub. Date: Oct. 15, 1998

[30] Foreign Application Priority Data

Apr. 10, 1997 [DE] Germany .............. 197 14 852

[51] Int. Cl.⁷ .................................... F16H 61/02
[52] U.S. Cl. ............................ 74/336 R; 701/51
[58] Field of Search ................ 74/336 R; 701/51

[56] References Cited

U.S. PATENT DOCUMENTS 5,754,968  5/1998  Hedstrom ................... 74/336 R

FOREIGN PATENT DOCUMENTS

| 0 800 022 A2 | 10/1987 | European Pat. Off. . |
| 0 341 631 B1 | 11/1989 | European Pat. Off. . |
| 36 25 156 A1 | 2/1987 | Germany . |
| 41 26 571 A1 | 2/1993 | Germany . |
| 42 40 621 A1 | 6/1994 | Germany . |
| 43 11 886 A1 | 10/1994 | Germany . |
| 197 09 506 A1 | 11/1997 | Germany . |

*Primary Examiner*—Dirk Wright
*Attorney, Agent, or Firm*—Davis and Bujold

[57] ABSTRACT

A method is proposed for increasing the spontaneity of an automatic transmission where the gear shifts are carried out as overlapping gears. Here an upshift from a first to a second reduction step is not completely terminated and a change over to a downshift is carried out when an abort criterion is detected.

7 Claims, 3 Drawing Sheets

| Clutch - Logic | | | | | | | | |
|---|---|---|---|---|---|---|---|---|
| Pos/Gear | Clutch | | | | | | | Freewheel |
| | A | B | C | D | E | F | G | 1. G. |
| R = R-Gear |  | * |  | * |  |  | * |  |
| N = Neutral |  |  |  |  |  | * | * |  |
| D, 1. Gear | * |  |  |  |  |  | * | * |
| D, 2. Gear | * |  | * |  |  |  | * |  |
| D, 3. Gear | * |  | * |  |  | * |  |  |
| D, 4. Gear | * |  |  |  | * | * |  |  |
| D, 5. Gear |  |  | * |  | * | * |  |  |
| 1, 1. Gear | * |  |  | * |  |  | * | * |

\* = active

INCREASED-SPONTANEITY AUTOMATIC GEAR BOX

BACKGROUND OF THE INVENTION

The invention concerns a method for increasing the spontaneity of an electrohydraulically controlled automatic transmission in which a gear shift is carried out by a second clutch closing while a first clutch opens.

In automatic transmissions, the gear shifts can be carried out with overlapping gears, i.e. a first clutch opens and a second clutch closes. The state and pressure curve of the clutches involved in the gear shift is here determined by an electronic transmission control via electromagnetic actuators. Such a method of control or regulations is known from DE-OS 42 40 621.

In automatic transmissions, gear shifts are usually made when a desired performance presettable by a driver, e.g. an accelerator pedal value, exceeds a shift characteristic line of a characteristic field. Besides said gear shifts triggered by means of accelerator pedal, a driver also has the possibility at any moment manually to make downshifts. DE-OS 43 11 886, e.g. thus shows a device by which a driver can make gear shifts by means of a selector lever having a manual gate or switching levers on the steering wheel. In the practice, the following problem can arise when during an overtaking maneuver the driver must let pass the traffic coming in opposite direction. He will then release the accelerator pedal. If the accelerator pedal value exceeds an upshift characteristic line, as consequence of this the automatic transmission carries out an upshift. If during the upshift the driver detects that the opposite road is now free, he will again actuate the accelerator pedal. But the automatic transmission will first terminate the upshift, then follows a blocking time and only then will the automatic transmission carry out a downshift. The problem thus consists in that between the driver's required performance and the reaction thereto of the automatic transmission a corresponding long time elapses. Many drivers find this long reaction time disturbing.

To this extent, the problem to be solved by the invention is to increase the spontaneity of an automatic transmission.

SUMMARY OF THE INVENTION

As an improvement EP-OS 0 341 631, e.g., describes a method for control of an overlapping gear in which an introduced first gear shift is not completely carried out when after laps of a blocking time after the shift command for the first gear shift, a shift command for a second gear shift follows within a period of time in which the clutch to be disengaged is still torque conductive and the clutch to be engaged still transmits no torque. In case of a second gear shift command after this moment, that is, at the end of the first and during the second phase of the overlapping gear, it is that the started first gear shift is completely carried out, another blocking time is waited for and then the secondary gear shift is carried out.

The problem thus consists in that mostly a long time offset exists between the driver's wish relative to acceleration and the reaction thereto of the automatic transmission.

According to the invention, the problem is solved by the fact that during an upshift from a first to a second gear the upshift is not completely terminated and a change over to a downshift to the first gear immediately takes place when an abort criterion is detected. The abort criterion is determined from a downshift requirement presettable by the driver.

According to the invention, the solution offers the advantage that the characteristic of the automatic transmission is more closely tied to the driver's desired performance, i.e. unlike in the prior art the upshift immediately is interrupted and a change to the downshift immediately takes place. Due to the closer tie between the characteristic of the automatic transmission and the driver's desired performance, a shorter reaction time is achieved. The automatic transmission acts with more spontaneity.

In development of this, it is proposed that during the upshift from the first to the second reduction step, when the abort criterion has been met, an admissibility be additionally tested. The admissibility is satisfied when the actual transmission input rotational speed value is within a rotational value range with a first and second limit value. The first limit value is here a function of the synchronous rotational speed value of the first reduction step and the second limit value is a function of the synchronous rotational speed value of the second reduction step. In a development of this, it is further tested whether the curve of the gradient of the transmission input rotational speed is within a preset rotational speed range. The two developments essentially contribute to the operating safety of the automatic transmission, since gear shifts close to the synchronization points are not admitted and, in addition, are tested to see if the upshift develops perfectly.

In one other development, it is proposed that upon issuance of the disengagement command for the first clutch a time step be started which extends up to a maximum time wherein with each value of the time step a reduction time is associated and, in development of this, it further is proposed that a rapid filling time of the first clutch now to be again engaged in the downshift be changed depending on the reduction time. The advantage here obtained is that the first clutch engages more gently during the downshift. Jolts are thus averted.

BRIEF DESCRIPTION OF THE DRAWING(S)

A preferred embodiment is shown in the drawings. In the drawings:

FIG. 1 is a system diagram;
FIG. 2 is a clutch logic; and
FIGS. 3A–3E are time diagrams.

DESCRIPTION OF THE PREFERRED EMBODIMENT(S)

Figure 1:
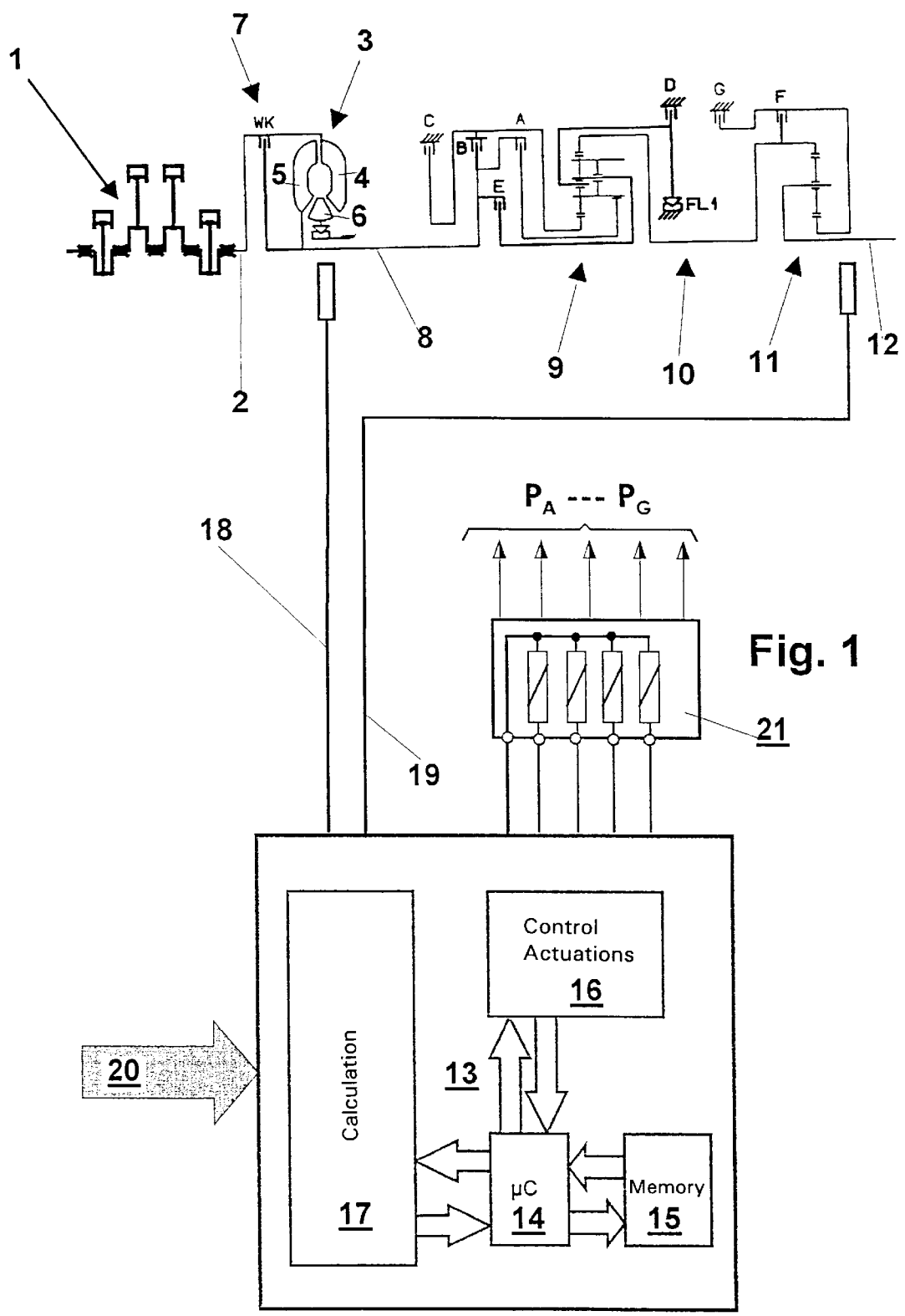

FIG. 1 shows a system diagram of an automatic transmission. It consists of the intrinsically mechanical part, a hydrodynamic converter 3, a hydraulic control device 21 and an electronic transmission control 13. The automatic transmission is driven by a drive unit 1, preferably an internal combustion engine, via an input shaft 2. The latter is non-rotatably connected with the impeller of the hydrodynamic converter 3. The hydrodynamic converter 3 is known to consist of an impeller 4, a turbine wheel 5 and a stator 6. Parallel to the hydrodynamic converter 3 is located a converter clutch 7. The converter clutch 7 and the turbine wheel 5 lead to a turbine shaft 8. When the converter clutch 7 is actuated, the turbine shaft 8 has the same rotational speed as the input shaft 2. The mechanical part of the automatic transmission consists of clutches and brakes A to G, a free wheel 10 (FL1), a Ravigneaux set 9 and a rear-mounted planetary gear set 11. The output takes place via the transmission output shaft 12. The latter leads to a differential, not shown, which, via two axle half shafts, drives the wheels of a vehicle. A gear of the automatic transmission is established by an appropriate clutch/brake combination. The coordination of the clutch logic with the gear can be seen in FIG. 2. For example, according to this table in an upshift from the second gear to the third gear, the brake G opens and the clutch F closes. As it further can be seen from the table, the gear shifts from the second to the fifth gear are carried out as overlapping gear shifts. Since the mechanical part is not relevant for better understanding of the invention, a detailed description is omitted.

According to the input variables 18 to 20, the electronic transmission control 12 selects an adequate gear. The electronic transmission control 13 then activates, via the hydraulic control unit 21 where electromagnetic actuators are located, an adequate clutch/brake combination. During the gear shift transitions, the electronic transmission control 13 determines the pressure curve of the clutches/brakes involved in the gear shift. As blocks of the electronic transmission control 13 are shown in extensively simplified manner: micro-controller 14, memory 15, function block control actuators 16 and function block calculation 17. In the memory 15 are deposited the data relevant to the transmission. Data relevant to the transmission are also diagnosis data, e.g. programs, gear shift characteristic lines and specific characteristics of the vehicle. The memory 15 is usually designed as EPROM, EEPROM, or buffered RAM. In the function block calculation 17, the data relevant to a gear shift curve are calculated. The function block control actuators 16 serves to control the actuators located in the hydraulic control unit 21. The electronic transmission control 13 receives input variables 20. Input variables 20 are, e.g. a variable representing the driver's desired performance such as accelerator pedal value/throttle valve position or manually requested gear shifts, the signal of the torque emitted by the internal combustion engine, the rotational speed or temperature of the internal combustion engine, etc. The specific data of the internal combustion engine are usually prepared by an engine control device. This is not shown in FIG. 1. The electronic transmission control 13 receives as added input variables the rotational speed of the turbine shaft 18 and the rotational speed of the transmission output shaft 19.

FIG. 3 shows a time diagram for an upshift with subsequent downshift. FIG. 3 consists of the parts FIGS. 3A to 3E. Each one shows here in the course of time: FIG. 3A the signal curve of a variable representative of the driver's desired performance, here throttle valve information DKI, FIG. 3B the signal curve shift command SB, FIG. 3C the rotational speed curve of the transmission input shaft nT, FIG. 3D the pressure curve of the first clutch pK1 and FIG. 3E the pressure curve of the second clutch pK2. In FIG. 3B to 3E, two examples are shown in each wherein the first example shows a curve according to the prior art (dotted line) and the second example a solution according to the invention (solid line). For the first example, they are in FIG. 3C the series of curves with the points A, D and E. In FIG. 3D this is the series of curves with the points M, P and R. In FIG. 3E this is the series of curves with the points F, G, K and L. For the second example, FIG. 3C is the series of curves with the points A, B and C; FIG. 3D is the series of curves with the points M, N, O and R; and FIG. 3E is the series of curves with the points F, G and H. The time diagrams of FIG. 3 are based on the case that a driver detects during an overtaking operation that he must let the traffic pass from the opposite direction. The driver will immediately release the accelerator pedal. It is assumed that by releasing the accelerator pedal, an upshift characteristic line is exceeded. The upshift is carried out as traction or coast upshift. After the opposite lane is now free, the driver will again try to overtake. As consequence of this, he will strongly actuate the accelerator pedal. It is assumed that by actuating the accelerator pedal, a downshift characteristic line is exceeded, i.e. the downshift is carried out as traction downshift. The different traction/coast is usually found with the aid of a characteristic field. Such characteristic field is known from DE-OS 44 17 477 for example. It is further assumed that the abort criterion is admissible, i.e. an actual transmission input rotational value nT is within a rotational speed range. The rotational speed range is defined by a first and a second limit value. It is further assumed that the gradient of the transmission input rotational speed nT is within a preset rotational speed channel, that is, the gear shift develops perfectly.

Figure 3A:
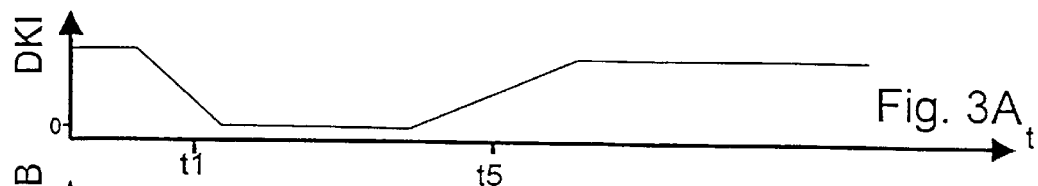
Figure 3B:
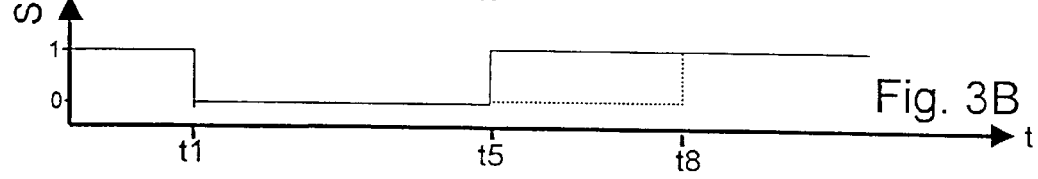

First example:

At moment t1, the DKI value exceeds the upshift characteristic line. The electronic transmission control will then issue an upshift command. This is shown in FIG. 3B by the signal curve SB changing from one to zero. Likewise at moment t1 up to moment t2, the second clutch K2 is loaded with rapid filling pressure, pressure level corresponding here to point F. At moment t2 follows the filling equalization phase for this clutch. At moment t3 the second clutch K2 begins a pressure increase according to a ramp function. During the ramp, the second clutch begins to take over the torque from the first clutch, i.e. the first clutch can be disengaged at moment t3. The load take over of the second clutch K2 from the first clutch K1 appears in FIG. 3C at the point A, i.e. the synchronization point nT(i1) of the first reduction step in which the transmission input rotational curve nT changes in direction toward the synchronization point nT(i2) of the second reduction step. At moment t4, the second clutch K2 has entirely taken over the load. At moment t5, the DKI value exceeds a downshift characteristic line. According to the prior art, the upshift is now first completely terminated. It is terminated at moment t7, since the transmission input rotational speed nT has reached the synchronization point nT(i2) of the second reduction step, point D. After termination of the upshift, a blocking time follows. The blocking time is usually needed because it must be ensured that the first clutch K1 to be disengaged in the upshift operation be completely drained. If this is not the case, then the rapid filling of the first clutch K1, again now to be again engaged in the downshift, makes itself negatively noticeable in the form of a jolt. After expiration of the blocking time, the downshift is triggered at moment t8 by the electronic transmission control issuing the downshift command. The curve of the signal SB in FIG. 3B changes from zero to one. The first clutch is simultaneously loaded with the rapid filling pressure up to moment t11. Thereafter the first clutch K1 up to moment t12 follows the filling equalization phase followed by a pressure breakdown ramp which ends at moment t14, point R. Simultaneously at moment t8 to moment t13, the second clutch K2 is disengaged in several steps. As consequence of this, the transmission input rotational speed nT changes from the rotational speed level of the point D in direction of the synchronization point nT(i1) of the first reduction step, this corresponds in FIG. 3C to the point E. At moment t14, the downshift is terminated.

Second example:

In the time interval from moments t1 to t5, the method develops as described above. At moment t5 to moment t6, i.e with the issuance of the gear shift command by the electronic transmission control, the first clutch is immediately loaded with a time reduced rapid filling pressure, pressure level corresponding to point N. Thereafter follows the filling equalization phase and a pressure ramp. The pressure ramp terminates at point O, moment t9. At moment t5, the pressure level pK2 of the second clutch is reduced from point G until it is then completely disengaged at moment t7. As a consequence of the reduction of the pressure level of the second clutch pK2, the curve of the transmission input rotational speed is changed at point B. The transmission input rotational speed nT will approach in direction to the synchronization of the first reduction step nT(i1), i.e. the point C in FIG. 3C. At moment t7 said synchronization point has been reached. Therewith the downshift terminates.

Figure 3C:
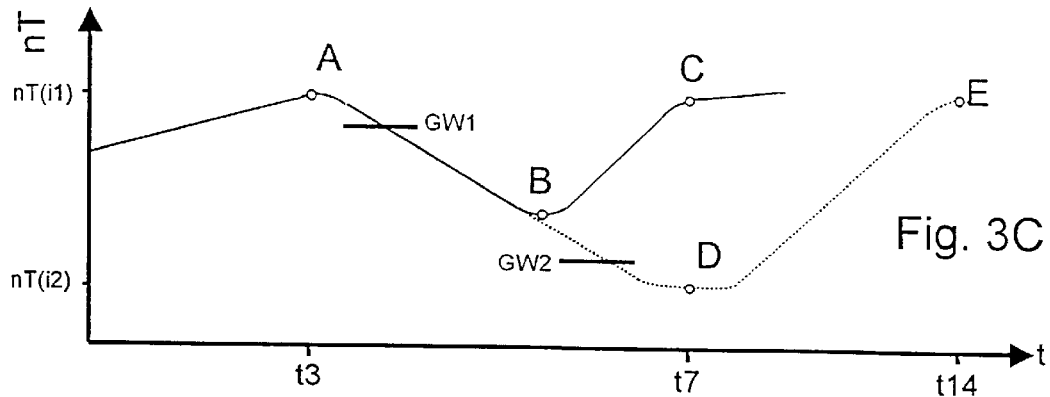
Figure 3D:
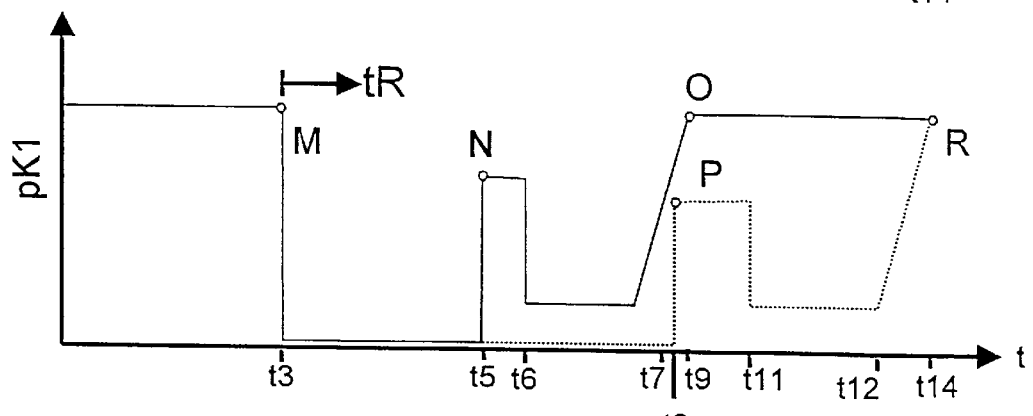
Figure 3E:
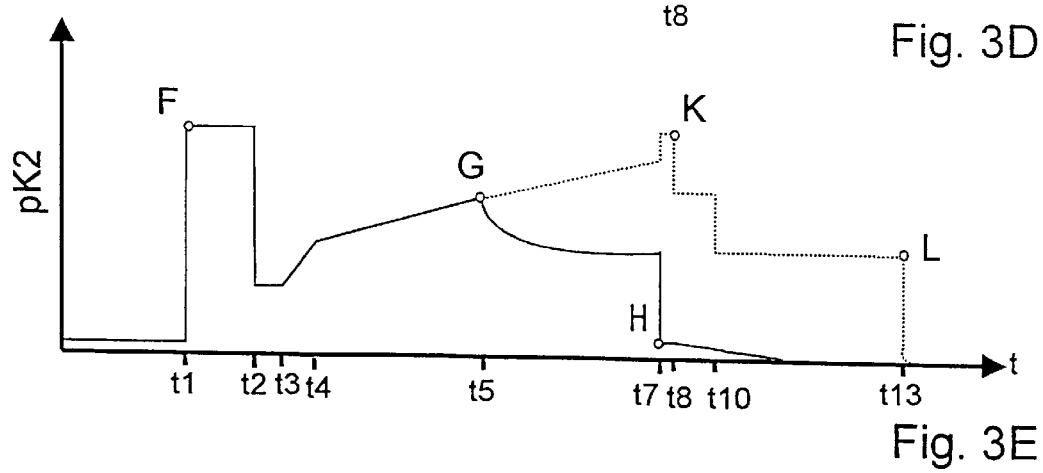

In a development of the invention, it is proposed that with the disengagement of the first clutch K1, a time step tR be started which corresponds in FIG. 3D to moment t3. This time step extends to a maximum time. With each value of the time step is associated a reduction time. The rapid filling time tSF of the first clutch K1 again is engaged in the downshift, i.e. the time interval t5 to t6, is changed according to said reduction time. A lesser value of the time step tR causes a brief rapid filling. Hereby is ensured that the still incompletely drained first clutch K1 is not filled for too long during the engagement operation.

In FIG. 3C are plotted a first limit value GW1 and a second limit value GW2. The abort criterion is admissible when the transmission input rotational speed nT is within the rotational speed range between GW1 and GW2. The first limit value GW1 is a function of the synchronous rotational speed value of the first reduction step. The second limit value GW2 is a function of the synchronous rotational speed value of the second reduction step. For example, this can be expressed according to the following formula:

GW1: nT(i1)−offset
GW2: nT(i2)+offset
GW1: first limit value
GW2: second limit value
nT(i1): synchronous rotational speed of the first reduction step
nT(i2): synchronous rotational speed of the second reduction step
offset: absolute rotational speed value, for ex., 200 1/min, or relative to the difference nT(i2)−nT(i1)

According to the prior art, i.e. according to the first example, the upshift is terminated with subsequent downshift at moment t14. According to the invention, the same gear shift in the second example is already terminated at moment t7. This time interval t14 to t7 makes itself clearly noticeable as time advantage, i.e. the reaction of the automatic transmission is more closely tied to the driver's desired performance. The transmission thereby acts more spontaneously.

Reference Numerals 1 drive unit
2 input shaft
3 hydrodynamic converter
4 impeller
5 turbine wheel
6 stator
7 converter clutch
8 turbine shaft
9 Ravigneaux set speed signal
10 free wheel FL1
11 planetary gear set
12 transmission output shaft
13 electronic transmission control
14 micro-controller
15 memory
16 function block control actuators
17 function block calculation
18 turbine rotational speed signal
19 transmission output rotational
20 input variables
21 hydraulic control unit

What is claimed is:

1. A method for increasing the spontaneity of an electro-hydraulically controlled automatic transmission in which a gear shift is carried out by a second clutch (K2) closing while a first clutch (K1) opens, wherein during an upshift from a first (i1) to a second (i2) reduction step, the upshift is not completely terminated and a change to a downshift to the first (i1) reduction step follows when an abort criterion is detected, the abort criterion being determined from a downshift request presettable by a driver.

2. The method according to claim 1, wherein during the upshift from the first (i1) to the second (i2) reduction step, when the abort criterion has been met, an admissibility of the upshift is tested, the admissibility being met when an actual transmission input rotational speed value (nT(t)) is within a rotational speed range with a first (GW1) and a second (GW2) limit value (GW1>nT (t)>GW2) said first limit value (GW1) representing a function of the synchronous rotational speed of the first reduction step (GW1=f(nT(i1)) and the second limit value a function of the synchronous rotational speed value of the second reduction step (GW2=f(nT(12)).

3. The method according to claim 2, wherein in addition is tested whether the curve of the gradient of the transmission input rotational speed value (nT(Grad)) is within a preset rotational speed channel.

4. The method according to claim 1, wherein upon issuance of the disengagement command for the first clutch (K1) a time step (tR) is started which extends up to a maximum time (tMAX), a reduction time being coordinated with each value of the time step (tR).

5. The method according to claim 4, wherein a rapid filling time (tSF) of the clutch (K1) now to be again engaged in the downshift is changed according to the reduction time.

6. The method according to claim 5, wherein the rapid filling time changes in the sense that a lesser value of the time step (tR) causes a brief rapid filling time (tSF).

7. The method according to claim 1, wherein during a change over from coast to traction, during the upshift from the first (i1) to the second (i2) reduction step, a time step (dt) begins in which the test of the admissibility in addition to the state of the time step is inquired and the change over to the downshift is carried out when the state of the time step exceeds (dt>GW) a limit value (GW).

* * * * *